United States Patent [19]

LeFrois

[11] 4,169,499
[45] Oct. 2, 1979

[54] SOLAR ENERGY HEAT UTILIZATION

[75] Inventor: Richard T. LeFrois, Minneapolis, Minn.

[73] Assignee: Honeywell Inc., Minneapolis, Minn.

[21] Appl. No.: 924,032

[22] Filed: Jul. 12, 1978

Related U.S. Application Data

[63] Continuation-in-part of Ser. No. 801,949, May 31, 1977, abandoned.

[51] Int. Cl.² ............................................. F28D 15/00
[52] U.S. Cl. .............................................. 165/1; 62/4;
 126/263; 126/417; 165/107 R; 165/DIG. 17
[58] Field of Search ....................... 62/4; 126/263, 270;
 165/1, 107, DIG. 17

[56] References Cited
U.S. PATENT DOCUMENTS

| | | | |
|---|---|---|---|
| 3,598,103 | 8/1971 | Curtis | 126/204 |
| 3,874,504 | 4/1975 | Verakas | 62/4 X |
| 3,923,057 | 12/1975 | Chalon | 128/188 |
| 3,958,625 | 5/1976 | Wentorf | 165/DIG. 17 |
| 3,967,676 | 7/1976 | Spacil | 165/DIG. 17 |
| 3,972,183 | 8/1976 | Chubb | 60/641 |
| 3,994,675 | 11/1976 | Sasse et al. | 432/1 |
| 4,004,571 | 1/1977 | Schwerzel et al. | 126/270 |
| 4,004,572 | 1/1977 | Nathan et al. | 126/270 |
| 4,004,573 | 1/1977 | Frieling et al. | 126/271 |

*Primary Examiner*—Leland A. Sebastian
*Attorney, Agent, or Firm*—Charles G. Mersereau

[57] ABSTRACT

A method of low temperature energy storage and utilization is disclosed which can be used in conjunction with low temperature heat sources such as solar energy flat plate collectors. Input heat energy is utilized to sustain the endothermic dissociation of ammonium carbamate produced from a reaction between urea and water. The energy is retained in the form of the higher energy containing dissociation products ammonia and carbon dioxide. The dissociation products are separated by liquifying and draining off the ammonia and are held under pressure. The stored heat is extracted in the form of output heat energy for an end use by reversing the dissociation reaction and combining the ammonia and carbon dioxide to form ammonium carbamate which becomes urea and water and is recirculated as a slurry. Closed-loop, fluid-medium heat exchange systems can be used both in the input and output sides of the energy system. The entire system operates at temperatures of less than 250° C. If desired, the system may be operated more efficiently and the corrosive properties of the urea-water slurry reduced by minimizing the formation of urea.

13 Claims, 1 Drawing Figure

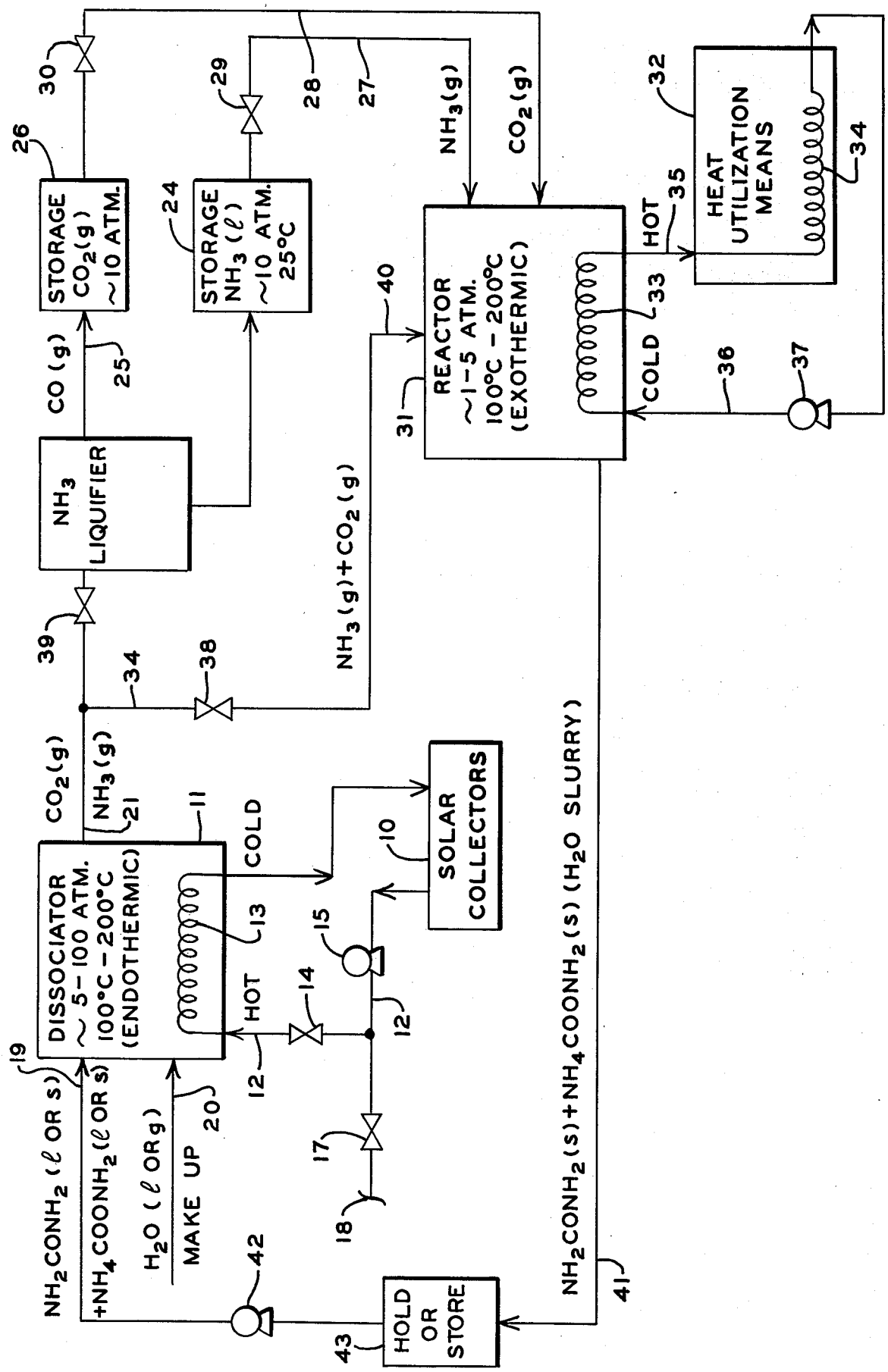

SOLAR ENERGY HEAT UTILIZATION

This application is a continuation-in-part of Ser. No. 801,949, filed May 31, 1977, now abandoned.

BACKGROUND OF THE INVENTION

1. Field of the Invention

The invention relates generally to a method of storage and utilization of heat energy and, in particular, the use of a low temperature reversible, controllable chemical dissociation and recombination reactions to provide a solar energy storage system.

2. Description of the Prior Art

The rapid depletion of conventional natural sources of energy is causing increasing national alarm over the probability of a severe energy crunch in the near future. This has lead to a recent technology explosion related to the exploitation of the use of solar energy as an alternative source to meet our ever-increasing energy needs. Solar energy is becoming important as a necessary alternative to such natural energy sources as petroleum and natural gas especially in the field of heating and cooling buildings and the generation of electrical power.

One of the problems associated with the utilization of solar energy in the heating and cooling of buildings and other low temperature applications utilizing such energy in the form of heat lies in the difficulty of storing heat extracted from solar collectors and the like for later use. Prior art attempts to achieve a practical method of storage of such heat energy include physical methods such as utilizing storage materials having high heat content or taking advantage of the heat of fusion or vaporization of materials. Additionally, the use of chemical reactions to store such heat for later use has been proposed.

One such prior art system is disclosed in a patent to Sasse, et al. U.S. Pat. No. 3,994,675 issued Nov. 30, 1976 in which certain compounds such as substituted naphthalenes are employed which undergo reversible endothermic photochemical reactions to form other compounds which can later be exothermically reverted to the original naphthalenes with the release of heat. That disclosure, of course, would require the actual reaction to take place in the presence of the solar energy. Another such reference is contained in a patent to Curtis U.S. Pat. No. 3,598,103 issued Aug. 10, 1971 in which an underwater heating system for a swimmer utilizes the heat of solution of ammonia in water to maintain the temperature of a swimmer's diving suit or underwater chamber at a comfortable level.

Additional prior art patents which utilize reversible chemical reactions to store energy chemically include U.S. Pat. No. 3,958,625 to Wentorf issued May 25, 1976 which discloses a method to absorb heat from a nuclear reactor by endothermically reacting carbon dioxide ($CO_2$) and methane ($CH_4$) to form a mixture of carbon monoxide (CO) and hydrogen ($H_2$). The CO and $H_2$ are subsequently reacted exothermically to reform $CH_4$ and $CO_2$ and the heat evolved utilized for other purposes in a relatively high temperature system. Another such process is illustrated and described in U.S. Pat. No. 3,967,676 to Spacil issued July 6, 1976 which reveals a process which also may be used in cooling nuclear reactors. That reference involves endothermically dissociating phosgene ($COCl_2$) to form carbon monoxide (CO) and chorine ($Cl_2$) and subsequently exothermically reacting the CO and $Cl_2$ to reform $COCl_2$. That system is also designated to operate in the higher temperature range of 400° to 500° C.

Of the above prior art energy storage use applications, those involving reversible chemical reactions appear to provide more practical means of energy storage and reconversion. While each of these may be used successfully in certain environments, each also suffers from certain drawbacks for relatively low-temperature applications. Thus, certain of the prior art chemical heat storage and utilization systems involving reversible reactions require relatively high temperatures or contain highly toxic substances as evidenced by the use of carbon monoxide and phosgene.

SUMMARY OF THE INVENTION

By means of the present invention many of the problems associated with prior art chemical energy storage systems are solved by the use of a low-temperature endothermic/exothermic reversible chemical reaction system which is neither photosensitive nor does it contain highly toxic substances. The present invention contemplates the use of input energy in the form of heat such as that obtained from solar collector panels to sustain the endothermic dissociation of ammonium carbamate into ammonia and carbon dioxide and use of output energy from the recombination of ammonia and carbon dioxide to form urea in a closed-loop recirculating system. The energy can be utilized immediately or stored indefinitely in the form of liquified ammonia and pressurized carbon dioxide. Conventional dissociators and reactors and ammonia liquification apparatus can be used in conjunction with closed-loop, fluid heat exchange systems in both the input and output portions of the system. The entire system can be operated at temperatures of less than 200° C. and represents a practical direct use of heat obtained from conventional solar collector panels. Representative chemical equations concerning both the heat input or storage and utilization or output as follows:

Input:

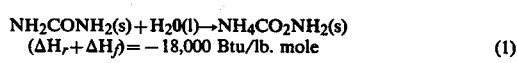
$NH_2CONH_2(s) + H_2O(l) \rightarrow NH_4CO_2NH_2(s)$
$(\Delta H_r + \Delta H_f) = -18{,}000$ Btu/lb. mole    (1)

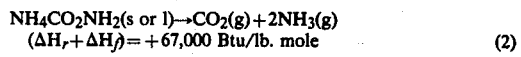
$NH_4CO_2NH_2(s \text{ or } l) \rightarrow CO_2(g) + 2NH_3(g)$
$(\Delta H_r + \Delta H_f) = +67{,}000$ Btu/lb. mole    (2)

Output:

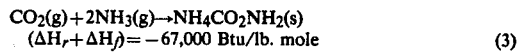
$CO_2(g) + 2NH_3(g) \rightarrow NH_4CO_2NH_2(s)$
$(\Delta H_r + \Delta H_f) = -67{,}000$ Btu/lb. mole    (3)

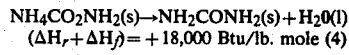
$NH_4CO_2NH_2(s) \rightarrow NH_2CONH_2(s) + H_2O(l)$
$(\Delta H_r + \Delta H_f) = +18{,}000$ Btu/lb. mole (4)

The system may be operated under conditions which minimize the formation of urea in equation (4) and thus also the necessity for the reverse reaction of equation (1). This increases the amount of net available heat from equation (3). In addition, this provides the benefit of reducing the corrosive potential of the urea-water mixture by maintaining an ammonium carbamate-water system which is far less corrosive to steel.

BRIEF DESCRIPTION OF THE DRAWING

The single FIGURE represents a schematic diagram of the system of the invention.

DESCRIPTION OF THE PREFERRED EMBODIMENT

The single FIGURE manifests a typical system embodiment in which the present invention may achieve practical utilization. The invention generally contemplates collecting energy into the input portion of the system such as from solar collectors or a geothermal source when that energy is available and storing the energy chemically for later utilization on the output side when a demand for use of the energy exists.

The system of the invention includes a source of energy in the form of heat which may include one or more solar collectors 10 which may be utilized to heat a fluid heat transfer medium contained therein. The solar collectors or other source of heat energy are utilized to provide heat input to a dissociator 11, which may be a reaction vessel compatible with the system environment, through a closed-loop recirculating system. The input system includes a fluid conduit 12 for conducting heated heat transfer medium from the solar collector to the dissociator 11, heat exchanger 13 which may be a finned tube or other conventional means suitable for transferring heat from the fluid conduit 12 to the contents of the dissociator 11 and a return heat transfer fluid conduit 14 for recirculating the heat transfer fluid medium back to the collector. If necessary, a recirculating device such as a pump 15 may be used to maintain a circulation in the input heating system. Valves 16 and 17, or the like, may be used to direct the heated heat transfer fluid medium to other utilization means if desired. In this manner any portion of the heat input may be used or stored.

The dissociator 11, in addition to heat energy from the heat source 10, is charged with a recirculated mixture containing urea and a small amount of ammonium carbamate in the form of a water slurry through lines 18 and 19, respectively. Required makeup water is also provided at 20.

The dissociation reaction of the present invention normally takes place at a pressure of from about 5 to 100 atmospheres and a temperature between 100° C. and 200° C. and generally consists of the following two steps.

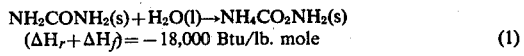

$$NH_2CONH_2(s) + H_2O(l) \rightarrow NH_4CO_2NH_2(s)$$
$$(\Delta H_r + \Delta H_f) = -18,000 \text{ Btu/lb. mole} \quad (1)$$

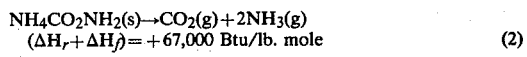

$$NH_4CO_2NH_2(s) \rightarrow CO_2(g) + 2NH_3(g)$$
$$(\Delta H_r + \Delta H_f) = +67,000 \text{ Btu/lb. mole} \quad (2)$$

The products of the dissociation of the ammonium carbamate in the form of $CO_2$ gas and $NH_3$ gas are conducted from the dissociator 11 through line 21 to the energy storage section of the system. A conventional ammonia liquification apparatus, shown in block form at 22, may be used to cool and pressurize both the ammonia and the carbon dioxide such that the ammonia is separated as a liquid through line 23 to be stored in a conventional ammonia storage vessel as at 24 and stored at a nominal pressure of about 10 atmospheres and at approximately room temperature. At the temperatures and pressures involved, the $CO_2$, of course, remains in the gaseous state and is conducted as though line 25 to a separate conventional storage vessel illustrated at 26. The separated $CO_2$ and ammonia constitutents can be stored indefinitely in vessels such as 24 and 26 until utilized to produce needed heat.

The output or energy utilization portion of the energy storage and utilization system of the present invention includes component conducting lines 27 and 28 which may be suitably valved as at 29 and 30, respectively, to carry and control the flow of ammonia and carbon dioxide to a reactor vessel illustrated at 31 in which the exothermic reaction recombining the carbon dioxide and ammonia takes place.

The ammonia and $CO_2$ may be introduced into the reactor chamber 31 from their respective storage containers through expansion valves 29 and 30 in the proportions required for recombination reaction. Precise metering, of course, is not required. The $NH_3$ and $CO_2$ are recombined in the reaction at a temperature normally in the range of from 100° C. to 200° C. and at a pressure normally held between 1 and 5 atmospheres according to the following equations:

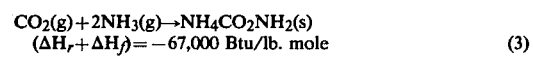

$$CO_2(g) + 2NH_3(g) \rightarrow NH_4CO_2NH_2(s)$$
$$(\Delta H_r + \Delta H_f) = -67,000 \text{ Btu/lb. mole} \quad (3)$$

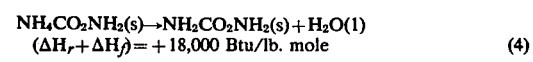

$$NH_4CO_2NH_2(s) \rightarrow NH_2CO_2NH_2(s) + H_2O(l)$$
$$(\Delta H_r + \Delta H_f) = +18,000 \text{ Btu/lb. mole} \quad (4)$$

As can be seen from the above equations an approximate net yield of 49,000 Btu/lb. mole is made available at the reactor by the exothermic recombination reaction. Of course, this may be decreased by one or more latent heats of fusion if all the cooling phase changes do not occur at the temperature and pressure at which the particular application of the system requires the system to be operated. If the system is operated such that the heat is extracted below about 132° C., the urea, for example, will solidify making available its latent heat of fusion, etc.

In the above manner a great deal of low temperature available heat can be produced for such applications as the domestic heating of water or air which does not require a high temperature heat source. The heat available at the reactor may be extracted by any conventional system which is capable of utilizing that heat in the temperature range of its operation. Thus, the heat utilization means dubbed 32 in the schematic illustration may represent a radiator, air heater, hot water heater or the like. It may operate as part of a closed-loop, fluid-tight recirculating heat transfer system including heat exchange surface segments 33 and 34 with associated input and recirculating heat transfer fluid lines 35 and 36, respectively. If required, a pump or similar device such as that illustrated at 37 may be employed to circulate the heat transfer fluid medium.

In addition to utilizing the potential heat energy stored in the pressurized $CO_2$ and liquified $NH_3$, many applications may require that a part of that potential energy be immediately available on a continuous or intermittent basis. In addition to using the input energy directly through line 18 this can readily be accomplished by feeding the $NH_3/CO_2$ mixture produced in the dissociator directly into the recombination reactor 31, as required, for immediate utilization of the energy. This is illustrated in the schematic figure by the provision of suitable valves at 38 and 39 operating in conjunction with a direct feed line 40 in a conventional manner. In this way all or any part of the products of the dissociation can be caused to bypass the separation and storage system and proceed directly to the reactor 31. If necessary, the heated dissociation products conducted directly from the dissociator 11 to the reactor 31 may be used to provide the heat required to initially bring the reactor up to operating temperature.

The products of the exothermic recombination reaction consist almost entirely of a water slurry of solid $NH_2CONH_2$ with a small portion of unconverted $NH_4COONH_2$ remaining. The slurry is recirculated through lines 41 and 19 by means of a pump 42, if necessary, returning to the dissociator for reuse in the closed-loop system of the invention. If necessary, a quantity of the slurry may be held or stored as at the intermittent vessel designated 43.

All the components in the system of the invention may be made of any material which is not corroded by the chemical constituents therein and does not react with them to contaminate the recirculating materials. These materials include stainless steels such as type 316 stainless or lead lined vessels for the higher temperature and pressure portions of the systems such as the dissociator and steel or other compatible material elsewhere.

In addition to the use of water as the carrier fluid, other suitable heat-transfer fluids may be used. In fact, the corrosive effect of the $NH_2CONH_2+NH_4COONH_2$ water slurry may be somewhat reduced by operating the system using an inert carrier heat transfer fluid. Any fluid having good heat-transport capability (density×heat capacity) and film-transfer coefficient and which is compatible with and chemically inert to the other constituents in the system may be used. Such a medium not only may reduce the potential for corrosion, but also can enhance the efficiency of heat transfer both into and out of the system. Of course, sufficient water must remain in the system to preserve the chemical urea-carbamate balance.

Examples of such fluid mediums include the modified ester Therminol 44 (Monsanto Chemical Co., St. Louis, Missouri) and an aromatic oil, Dowthern H (Dow Chemical Co., Midland, Michigan).

It will be appreciated that the system may also be operated so as to minimize the formation of urea. In that method of operation the conditions for the recombination of $CO_2$ and $NH_3$ to form $NH_4COONH_2$ (equation 3) are controlled and maintained to minimize the dehydration of the ammonium carbamate to urea (equation 4). This may be accomplished by (1) controlling the proportions of $NH_3$ at $CO_2$ admitted to the reactor 31 such that a stoichiometric or near stoichiometric ratio of the reactants is maintained; (2) maintaining an excess or a significant partial pressure of water vapor in the reactor 31; (3) maintaining the total system pressure above the equilibrium dissociation pressure for ammonium carbamate dehydration (equation 4), e.g., at 100° C., 8 atm., etc. In addition, a low loading density in the reactor 31 may be maintained. This is accomplished by keeping the reactor volume relatively large compared to the weight of reactants. The ammonium carbamate is then circulated as a water slurry with the water serving as the heat transfer carrier fluid as well as solute for solid ammonium carbamate.

While slightly more difficult to control, this mode of operation has several advantages. By eliminating the dehydration of ammonium carbamate, the endothermic reaction of equation 4 is virtually eliminated. This increases the potential extractive energy available at the heat utilization means 32 by approximately 18,000 Btu./lb. mole. Also, if desired, the sensible heat of crystallization of the ammonium carbamate may be recovered by precipitating the dissolved ammonium carbamate from solution. In addition, the ammonium carbamate-water recirculated slurry is far less corrosive than the urea-water mixture. This may allow the material construction of the system to be mild steel rather than the more expensive stainless steel.

From the above, it can readily be seen that the system of the present invention provides a practical low-temperature energy storage and utilization system which is adaptable to be used with conventional fluid-heating solar collector panels. The urea and water constituents required to operate the system are cheap and really available. Unlike phosgene and carbon monoxide, ammonia, while toxic in high concentrations is readily recognized by olefaction before the concentration reaches a harmful level and is a familiar compound to all householders. In addition, the system of the invention can be constructed of well-known components.

The embodiments of the invention in which an exclusive property or right is claimed are defined as follows:

1. A method of low temperature energy utilization comprising steps of:
   receiving input energy from a source;
   utilizing said energy in the form of heat to sustain the reversible endothermic chemical dissociation of ammonium carbamate to form carbon dioxide and ammonia;
   providing heat energy for an end use by chemically exothermically recombining said carbon dioxide and ammonia to provide output energy requirements.

2. The method of claim 1 wherein said input energy is received from a natural source.

3. The method of claim 1 wherein said input energy is solar energy.

4. The method of claim 1 including the step of separately storing said ammonia and carbon dioxide prior to the recombination thereof.

5. The method of claim 4 including the step of liquifying said ammonia under pressure and storing said ammonia under sufficient pressure maintain it in a liquid state.

6. The method of claim 4 in which said carbon dioxide is stored under pressure.

7. The method of claim 3 including the steps of
   heating a fluid heat transfer medium with said solar energy by means of at least one solar collector in a fluid-tight, closed-loop recirculating system;
   transferring heat from said fluid medium to said reactants in said endothermic chemical dissociation reaction.

8. The method of claim 1 including the step of utilizing said output energy from said exothermic recombination chemical reaction by transferring said heat through a suitable heat transfer fluid medium.

9. The method of claim 8 including the step of providing a closed-loop recirculating heat transfer system to extract said output heat and transfer same for the desired end use.

10. The method of claim 1 including the step of recirculating the products of said recombination reaction in a closed-loop system.

11. The method of claim 1 wherein the liquid and solid chemical species are carried by a non-aqueous carrier fluid medium.

12. The method of claim 1 including the step of controlling the condition of said exothermic recombining of ammonia and carbon dioxide to minimize the dehydration of ammonium carbamate.

13. The method of claim 12, including the step of recirculating the products of said recombination in an aqueous medium in a closed-loop system.

* * * * *